United States Patent
O'Callaghan et al.

(10) Patent No.: US 6,311,892 B1
(45) Date of Patent: Nov. 6, 2001

(54) AUTOMATIC SYSTEM FOR VERIFYING ARTICLES CONTAINING INDICIA THEREON

(75) Inventors: John S. O'Callaghan, Wilmette; Daniel Gibbons, Skokie; Tony S. Chan, Chicago; Ann Dawkins, Bartlett; Niren Shah, Skokie; Jack Bonn, Barrington, all of IL (US)

(73) Assignee: Bell & Howell Postal Systems, Inc., Lincolnwood, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/909,640

(22) Filed: Aug. 12, 1997

(51) Int. Cl.[7] ................................................. G06F 17/00
(52) U.S. Cl. .......................... 235/375; 235/385; 235/470; 209/584
(58) Field of Search .................................... 235/375, 376, 235/381, 385, 435, 470; 209/584, 900

(56) References Cited

U.S. PATENT DOCUMENTS

| | | | |
|---|---|---|---|
| 4,082,945 | 4/1978 | van de Goor et al. | 235/375 |
| 4,155,842 | 5/1979 | Wallace et al. | 209/553 |
| 4,255,652 | 3/1981 | Weber | 235/45 |
| 4,687,106 | 8/1987 | Prins | 209/552 |
| 4,778,062 * | 10/1988 | Pavie et al. | 209/546 |
| 4,800,505 * | 1/1989 | Axelrod et al. | 364/478 |
| 4,863,037 | 9/1989 | Stevens | 209/3.1 |
| 4,868,757 * | 9/1989 | Gil | 364/464.03 |
| 4,891,088 | 1/1990 | Svyatsky | 198/349 |
| 4,968,419 | 11/1990 | Karalus et al. | 209/539 |
| 4,979,605 * | 12/1990 | Svyatsky | 364/478 |
| 4,980,542 * | 12/1990 | Jackson et al. | 235/375 |
| 5,005,124 | 4/1991 | Connell et al. | 364/401 |
| 5,009,321 * | 4/1991 | Keough | 209/584 |
| 5,115,918 | 5/1992 | DeWitt | 209/560 |
| 5,119,954 | 6/1992 | Svyatsky et al. | 209/584 |
| 5,142,482 | 8/1992 | Sansone . | |
| 5,189,863 * | 3/1993 | Pozzi | 53/411 |
| 5,200,007 | 4/1993 | Svyatsky | 158/64 |
| 5,229,932 | 7/1993 | Connell et al. . | |
| 5,308,932 | 5/1994 | Manduley et al. . | |
| 5,329,102 * | 7/1994 | Sansone | 235/384 |
| 5,373,115 | 12/1994 | Manduley et al. . | |
| 5,508,818 * | 4/1996 | Hamma | 358/403 |
| 5,862,243 * | 1/1999 | Baker et al. | 209/272 |

* cited by examiner

Primary Examiner—Karl D. Frech
Assistant Examiner—Daniel St. Cyr
(74) Attorney, Agent, or Firm—Patula & Associates, P.C.

(57) ABSTRACT

Apparatus for automatically acquiring and verifying, relative to pre-established rules, information affixed to relatively flat articles transported along a transport path comprises weighing means for measuring weight of articles being processed, image acquisition means for acquiring a representation of indicia appearing on an article, processing means for recognition of the indicia appearing on an article, and processing means for verifying acquired data against the pre-established rules.

77 Claims, 3 Drawing Sheets

FIG. 3

| OFFSET | MESSAGE | NUMBER OF BYTES | CHARACTER FORMAT | RESULT |
|---|---|---|---|---|
| 0 | <START_CHAR> | 1 BYTE | ASCII | '#' |
| 1 | <SEQUENCE_NO> | 2 BYTES | HEX/ASCII | '00'→'FF' |
| 3 | <TYPE> | 1 BYTE | ASCII | SEE TABLE 33-22. |
| 4 | <DATA> | N BYTES | (SEE INDIVIDUAL MESSAGES) | (SEE INDIVIDUAL MESSAGES) |
| 4+N | <CRC> | 4 BYTES | HEX/ASCII | '0000'→'FFFF' |
| 8+N | <STOP_CHAR> | 1 BYTE | ASCII | 'V' |

FIG. 4

| TYPE FIELD | MESSAGE NAME | COMMENTS |
|---|---|---|
| 'A' | ACK | ACKNOWLEDGEMENT |
| 'B' | CPC_IPC_BEGINRUN | GET READY TO BEGIN AN INSPECTION RUN. |
| '@' | CPC_IPC_DIAGNOSE | REQUEST DIAGNOSTIC TO BE RUN ON IPC. |
| '%' | IPC_CPC_DIAGNOSTICRESPONSE | SENDS RESULT FROM A DIAGNOSTIC REQUEST |
| 'Y' | IPC_CPC_FAULT | ASYNCHRONOUS FAULT DETECTED. |
| 'N' | NACK | NEGATIVE ACKNOWLEDGEMENT |
| 'O' | IPC_CPC_POSTAGESCANRESULT | INFORMATION GLEANED FROM THE MAIL PIECE BY THE EXEGETICS IMAGING SOFTWARE. |
| 'P' | CPC_IPC_POSTAGE | EXPECTED POSTAGE SENT TO IMAGING PC. |
| 'Q' | IPC_CPC_BARCODE SCANRESULT | INFORMATION GLEANED FROM THE MAIL PIECE BARCODE OCR SCAN. |
| 'R' | IPC_CPC_ADDRESS SCANRESULT | INFORMATION GLEANED FROM THE MAIL PIECE BY THE DALLAS IMAGING SOFTWARE. |
| 'S' | CPC_IPC_SYNCHRONIZE | SYNCHRONIZE IPC WITH TIME STAMP. |
| 'T' | CPC_IPC_TRAYDATA | TRAY TAG DATA |
| 'V' | CPC_IPC_WEDGEDATA | SAMPLE WEDGE DATA |

AUTOMATIC SYSTEM FOR VERIFYING ARTICLES CONTAINING INDICIA THEREON

FIELD OF THE INVENTION

This invention relates generally to equipment for reviewing information printed on relatively flat articles, and for gathering information, such as weight, concerning these articles, and is more particularly directed toward automatic verification of postage and address information for articles to be mailed.

BACKGROUND OF THE INVENTION

Many corporations and organizations disseminate information and advertising material through the mail. In order to minimize the costs associated with this type of mailing, the United States Postal Service (USPS) offers bulk mailing rates that result in decreased cost of mailing for each piece of mail. Certain types of preprocessing by bulk mailing organizations, such as presorting of bulk mail into lots by ZIP code, helps the USPS in mail sorting and leads to further discounts in the cost of mailing for bulk mailing organizations.

Of course, because of the large volume of bulk mail, the USPS would lose considerable revenue if bulk mailing organizations failed to comply strictly with their presorting obligations but still tried to take advantage of lower postal rates. It is also possible, through error, that a bulk mailer may apply insufficient metered postage to articles of mail. In addition, the USPS must have some form of quality control and verification to ensure that bulk mailers' presort efforts are accurate, so that improperly sorted bulk mail does not slow down the operation of USPS sorting activities.

Traditionally, this verification process is performed manually (with the exception of barcode verification). This manual verification process is very labor intensive and prone to error. Accordingly, a need arises for an automated verification system that is capable of processing large volumes of mail with speed and accuracy, and that maintains proper records relating to each bulk mailer for which verification operations are conducted.

SUMMARY OF THE INVENTION

These needs and others are satisfied by the verification apparatus of the present invention. In accordance with the invention, apparatus for automatically acquiring and verifying, relative to pre-established rules, information affixed to relatively flat articles transported along a transport path comprises weighing means for measuring weight of articles being processed, image acquisition means for acquiring a representation of indicia appearing on an article, processing means for recognition of the indicia appearing on an article, and processing means for verifying acquired data against the pre-established rules.

The apparatus may further comprise infeed means for transporting the articles from an input stage to subsequent processing stages. The infeed means may comprise an infeed conveyor mechanism that singulates articles for subsequent processing.

In accordance with one aspect of the invention, the weighing means comprises an in-line scale that weighs articles individually. The apparatus may further comprise identification printing means for applying numeric identification to at least some of the articles. The printing means may comprise an ink jet print head disposed along the transport path.

In one form of the invention, the image acquisition means comprises a CCD camera and illumination means. The illumination means comprises a plurality of support structures housing light-directing fibers.

In another aspect of the invention, the processing means for recognition of the indicia appearing on an article returns postage information relating to postage type, wherein postage type is selected from the group of postage types consisting essentially of meter, permit, and stamp. The processing means for recognition of the indicia appearing on an article may return postage value, postage class, address information, and various kinds of barcode information such as barcode decode value and barcode print quality information. Both the processing means for recognition of indicia appearing on an article and the processing means for verifying acquired data may comprise a microcomputer.

In yet another aspect of the invention, the apparatus may further comprise stacking means for re-collecting articles. In general, the articles disposed along the transport path are arranged in an original order and orientation, and the stacking means re-collects the articles in the original order and orientation.

In still another form of the invention, the pre-established rules may include a number of parameters such as bar code print quality, compatibility of bar code decode value and address information, weight restrictions, postage type restrictions, postage value restrictions, postage class restrictions, and destination sort requirements. Sort requirements may be valid for a current sort data base, or for one or more prior databases.

In still another aspect of the present invention, verification results are printed as reports in a predetermined format. The apparatus may further comprise scanning means for automatic reading of bar codes associated with groups of articles.

In yet another form of the invention, apparatus for automatically acquiring, storing, and verifying indicia affixed to relatively flat articles comprises infeed means for transporting articles from an input stage to subsequent processing stages, weighing means for measuring weight of articles being processed, printing means for affixing identifying indicia to each article, image acquisition means for acquiring a representation of selected indicia appearing on each article, control processor means for controlling acquisition, storage, and verification, and image processing means, in communication with the control processing means, for synchronization of acquisition, storage, and verification.

The infeed means preferably comprises an infeed conveyor mechanism that singulates articles for subsequent processing. The weighing means may comprise an in-line scale that weighs each article individually, and the printing means comprises an ink jet print head disposed proximate to the image acquisition means. The image acquisition means preferably comprises a CCD camera and illumination means.

In one form of the invention, the illumination means comprises a plurality of support structures housing light directing fibers. The control processor means comprises a microcomputer controller in communication with the image processing means, while the control processor means communicates with the image processing means via a serial communications protocol. The image processing means is preferably a microprocessor controller in serial communication with the control processor means.

In accordance with one aspect of the invention, apparatus for processing and verifying indicia disposed upon articles to be mailed comprises an infeed magazine in communication with a transport mechanism defining a transport path for the articles, a weighing station receiving articles from the transport mechanism and weighing each article individually, an ink jet printer disposed along the transport path, the ink jet printer applying a numeric identification to each article, a camera unit positioned along a scanning locus that scans the indicia disposed on each article and stores image information in an associated memory, an illumination mechanism associated with the camera unit, providing illumination directed toward the scanning locus, and a control processor and an image processor interconnected by a serial communication link, the control and image processors synchronizing data acquisition, storage, and comparison for verification of indicia disposed upon the articles.

In one form of the invention, the serial communication link comprises a bi-directional serial link over which commands, status messages, and data packets are exchanged. The bi-directional serial link comprises an RS-232 serial link at approximately 19,200 baud. Serial messages are exchanged over the serial communication link, and each serial message begins with a predetermined start character and ends with a predetermined stop character. Preferably, the start character and stop character are 1 byte ASCII characters.

In yet another aspect of the invention, each serial message includes cyclic redundancy check information and a sequence number. Each message is acknowledged by the recipient through transmission of an acknowledgment message when the message is received correctly, and each incorrectly received message causes a negative acknowledgment message to be transmitted. Preferably, the sender resends a message at least once if an acknowledgment message is not received within a predetermined time. Each acknowledgment message includes the sequence number.

Further objects, features, and advantages of the present invention will become apparent from the following description and drawings.

BRIEF DESCRIPTION OF THE DRAWINGS

FIG. 3 is a table depicting a serial message format suitable for intercommunication in the automatic verification system of FIG. 2;

FIG. 4 is a table showing permissible message types under the serial format depicted in FIG. 3;

DETAILED DESCRIPTION OF THE INVENTION

In accordance with the present invention, an automatic verification system is described that provides distinct advantages when compared to verification processes of the prior art. The invention can best be understood with reference to the accompanying drawing figures.

Figure 1:
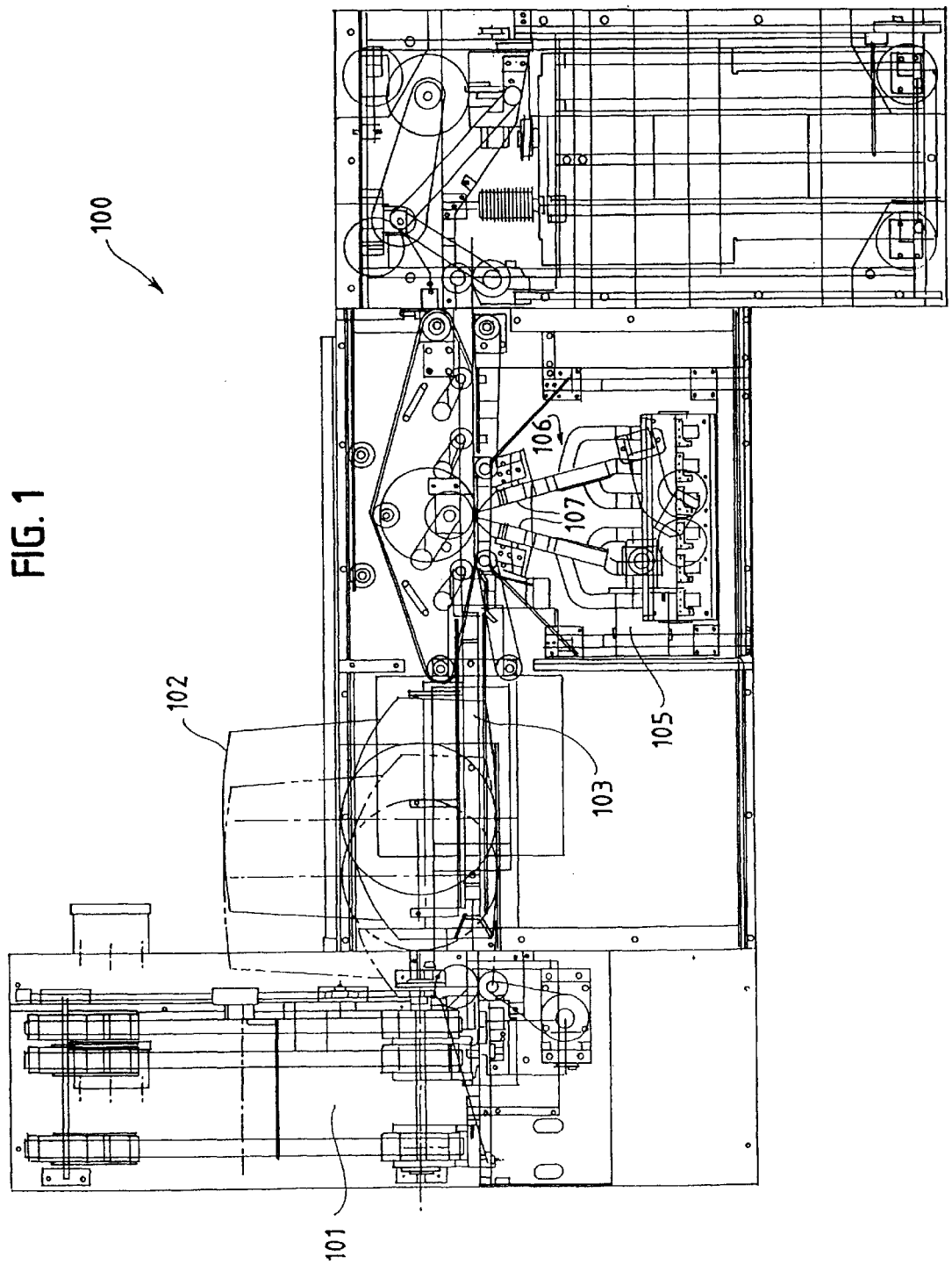
FIG. 1 illustrates the components of an automatic verification system in accordance with the present invention.

The automatic verification system of FIG. 1, generally depicted by the numeral 100, has a capacity to accommodate one full (two-foot) letter tray of mail, and will feed trays of either letter or flat mail in excess of 6,000 pieces per hour. The infeed magazine 101 that provides this capability will process one tray of mail per run. From the feeder 101, each mailpiece proceeds into a scale/settling station 102. This station 102 weighs each piece of mail individually, and then correctly registers the bottom edge of the mailpiece onto an associated transport plate.

Supported by pinch belts, each mailpiece proceeds along the transport path 103, where a 15 inch, high-resolution camera 105 captures an image of the piece for further processing. An ink jet printer 104 is then used to spray a numeric identification (ID) on each piece. The piece is then stacked in its original order and orientation, while an intelligent tracking system ensures quality and accuracy of inspection.

Figure 2:
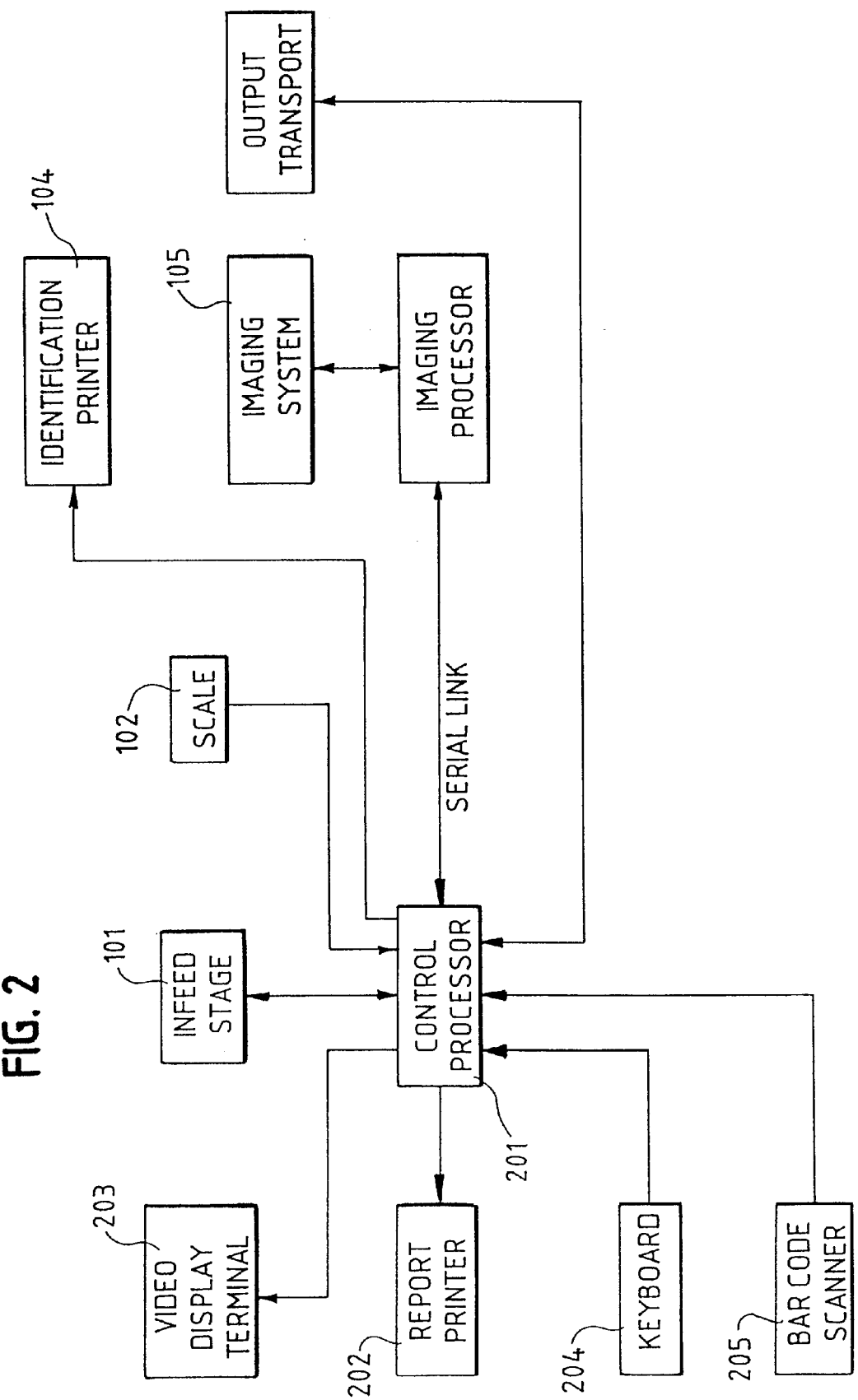
FIG. 2 is a block diagram of an automatic verification system in accordance with the present invention illustrating interconnection of system elements.
Figure 1:
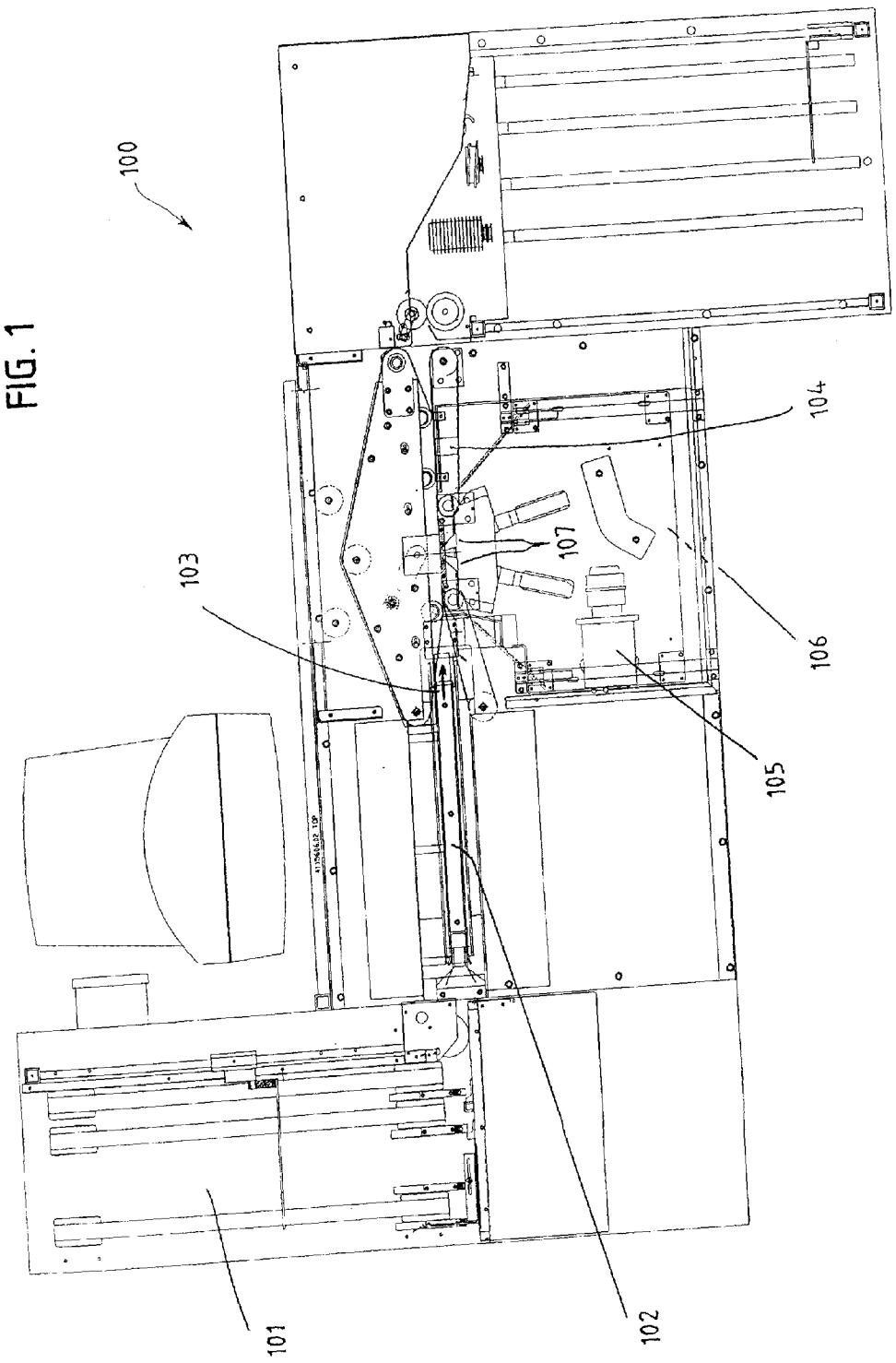

The block diagram of FIG. 2 depicts a control processor 201 that provides a user interface prompting the operator to perform specific actions, such as inputting data, loading the magazine, starting the transport mechanism, etc. After the operator enters all parameters, the required information is automatically measured. Measurement results are used to calculate and display bulk postage rate, total weight of mailing, number of sample units, error factor, percent error, additional postage due, and other relevant metrics.

With a throughput of 6,000 pieces per hour, the automatic verification system feeder unit 101 offers a reliable and powerful transport system. Mail pieces are directed from the feeder into the scale unit 102 that weighs individual mail pieces in line at a full 6,000 pieces per hour rate. After the weighing operation, the mail pieces are scanned by the camera unit 105.

The camera unit 105 is a premier ultra-high density line scan array CCD (charge coupled device) camera. The camera 105 will scan at a rate of at least 200 scan lines per inch. This high resolution enables the automatic inspection system 100 to accurately determine Postnet barcode quality and to read address information from each mailpiece to verify barcode and postage data and to add other relevant information to the associated mailpiece data base. The system includes the capability to update and modify the data bases as required. After the scanning operation, an ink jet printer 104 prints identification information on each mail piece. The print head of the ink jet printer unit 104 is preferably positioned in proximity to the camera unit 105 for ease of mounting.

The system may further include a report printer 202 that presents the results of the verification process to an operator in hard-copy format. A plurality of reports may be made available, and the reports may be structured to match existing customer report formats or may be custom designed for particular applications. The system may also incorporate a video display terminal 203 for use in job set-up, input of parameters, and display of results.

The video display terminal 203 may also be used for the display of images acquired by the system during verification operation. At the operator's option, the video display terminal may display the image acquired by scanning a particular mailpiece, and may indicate, via colored rectangles, shadings, etc., selected words, individual characters, address block location, stamp, or other indicia that has been determined by the image processing recognition software.

The camera scan field is illuminated by a high-intensity light system 106 in which optical fibers arrayed in associated lighting towers 107 direct light from a centrally located high-intensity lamp sub-system. A dense, random array of optical fibers within each tower 107 allows for bright, even illumination within the scan area.

The system assigns each mailpiece to a data file that individually registers each mailpiece. As the mailpiece is processed, the weight of each piece and the associated numeric identification number that is applied to the mailpiece by the ink jet printer are also recorded in the file. The image that is scanned by the camera unit is also processed and filed.

The scanned image is processed by identifying the address block on the mail piece, reading the address, and verifying the address information. The system registers the corresponding barcode value to the file, reads the stamp value and stores its marking, and scans the barcode in detail to ensure that the print quality meets USPS specifications. The system identifies the existence, if any, of a postage meter imprint and the value of postage it represents, and the existence and identification of a permit imprint. The printed bar code value and quality assessment are also stored in the file for the associated mailpiece. At this point, the individual mailpiece file includes the ID number that has been printed on the mailpiece by the ink jet printer, the weight, stamp value, any existing endorsement, the address barcode value, the printed barcode value, and the quality of the barcode/ZIP code. The system identifies and verifies the accuracy of the printed barcode against the results of an address search within its address data base, and verifies that such aspects of the mail as postage paid, weight, etc., are consistent with the information provided by the mailer.

To aid in the acquisition of tray tag information, the verification system may incorporate a bar-code scanner 205 that reads the tray tag information. The tray tag information is generally expressed as a printed bar code on a tray or container of mail or other flat articles awaiting processing by the system. The tray tag generally includes information related to the contents of the tray, and thus defines a set of pre-established rules to which the articles must conform.

The verification process includes comparing information input to the system via keyboard 204, tray tag bar code scanner 205, scale 102, image acquisition and processing 105, and internal data bases to determine whether the pre-established rules have been followed.

The automatic verification system operates under the control of a Control Personal Computer (CPC) in communication with an Imaging Personal Computer (IPC). Communication between the CPC and IPC takes place over a bi-directional serial link that provides transfer of commands, status, and data packets in both directions.

The hardware interface between the CPC and IPC is an RS-232 serial link that is well-known in the applicable art. The hardware protocol calls for full duplex asynchronous transmissions at 19,200 baud with 1 start bit, 8 data bits, 1 stop bit, and no parity.

All serial messages between the IPC and CPC follow a predetermined format that is illustrated in FIG. 3. All messages begin with the START_CHAR and end with the STOP_CHAR. Each digit or character is sent using 8-bit ASCII (American Standard Code for Information Interchange). This is to ensure the ability to regain message synchronization if any characters are lost. The least significant bit of each byte is transferred first, in accordance with the ASCII standard. The CRC is a cyclic redundancy check computed by the sender and the recipient to make sure that no errors have occurred during transmission. It is formed using a selected CCITT polynomial, as is well-known, and is computed over the range of characters from SEQUENCE_NO through DATA. The 16-bit CRC is converted to ASCII using hexadecimal notation and stored in the 4 bytes at CRC. All message types are composed of ASCII characters (alphabetic characters are preferred). This facilitates debugging with a serial line analyzer. BCD (binary coded decimal) data are transferred most-significant byte first. A message may have no data bytes. This minimum size of a message is nine (9) bytes. The various permissible message types are illustrated in FIG. 4.

Each message is acknowledged by the recipient with an ACK (acknowledgment message). An ACK informs the sender that the message has been received successfully, is understood, and is being acted upon. The sender of the original request knows to expect an ACK in response to its request. It is up to the sender to wait for this response.

A NACK (negative acknowledgment message) tells the sender that the message is either not understood or not supported by the receiver. A NACK never happens if the serial interface has performed successfully and the message sent was properly formatted.

The sender does not send another request message until the previous request has been ACKed or has timed out. The sender generally retries sending a message up to two (2) times if it has not been ACKed within a predetermined time period. The sender stamps each message with a unique sequence number. This number is generated from an internal 8-bit counter that is incremented after each message transaction, and is allowed to roll over from 0xFF to 0000. The receiver echoes this sequence number back in the ACK/NACK response to this message. The sender uses the same sequence number on retries.

In general, the CPC updates the IPC with the Mail Piece Identification Number (MPID), the Mail Piece Weight Data (MPWD), and its time stamp. In response, the IPC replies with information that was received by the scanned mail piece. The messages that are normally sent from the CPC to the IPC are summarized below:

1. Synchronization Message—This message is sent when a sensor mounted near the camera array detects a mailpiece within the camera zone.

2. Postage Message—This message is sent when the scale sub-system has completed weighing a piece of mail. This message conveys to the IPC the amount of postage this mailpiece is expected to contain. It is derived from the weight of the mailpiece and knowledge of the characteristics of the type of mailing being verified. In most cases, a postage rate derived from standard (or bulk rate) USPS postage rate schedules will be used. The only exception occurs when the image processing indicates that the mail piece is non-profit in nature. In that event, a special non-profit postage field included with the Postage Message is used to determine the expected postage for the mailpiece.

3. Begin Run Message—This message is sent at the start of a run to direct the IPC to clear its buffers and prepare for the start of an inspection run. Additional information is also passed to the IPC regarding the statistics for the mailing, such as time of mailing, payment method to be used, the mailer's permit or meter number, and the weight of a single piece of mail (in the event that the mailing is being made at an Identical Weight Rate).

4. Tray Label Message—This message is sent by the CPC to pass information taken from the tray label on the mailing tray that contains the mailpieces that are being examined. This information includes the tray label bar code, the tray ZIP code, destination city and state, and class and sub-class of mail in the tray.

5. Wedge Data Message—This message conveys the relevant information from a sample wedge (a predetermined quantity of mail concerning which characteristics are known).

The IPC also transmits messages to the CPC. Among the IPC-transmitted messages are the following:

1. Address Scan Result Message—This message sends a formatted set of parameters back to the CPC. The referenced mail piece ID is transmitted along with the mailpiece ZIP code appearing on the mail piece and the ZIP code derived from the address information on the mailpiece.

2. Postage Scan Result Message—This message sends a formatted set of parameters from the IPC back to the CPC. The referenced mailpiece ID is transmitted along with the mailpiece postage meter date, the mailpiece payment method, and the mailpiece amount paid.

3. Barcode Scan Result Message—In this message, the IPC transmits the reference mailpiece ID, the mailpiece barcode, and a measure of barcode readability.

Both the CPC and the IPC are capable of transmitting ACK and NACK messages, both initiating and responding to diagnostic messages, and transmitting error indication messages.

There has been described herein an automatic verification system that is relatively free from the shortcomings of verification processes of the prior art. It will be apparent to those skilled in the art that modifications may be made without departing from the spirit and scope of the invention. Accordingly, it is not intended that the invention be limited except as may be necessary in view of the appended claims.

What is claimed is:

1. An apparatus for automatically acquiring and verifying, relative to pre-established rules, information from a plurality of pre-sorted mailpieces transported along a transport path, each mailpiece including address information and postage information visible on a face of each mailpiece, said plurality of pre-sorted mailpieces delivered to said apparatus in a container, said container accompanied by a label with certain visible data pertaining to said plurality of mailpieces, said apparatus adapted to process the address information and postage information on each mailpiece and the data visible on said label to verify the accuracy of said address information and postage information on each mailpiece, the accuracy of said data on said label relative to each other, the apparatus comprising:

a scale adapted to measure the weight of each mailpiece being processed;

an image acquisition device adapted to acquire a representation of address information and postage information appearing on each mailpiece;

a scanning device, separate and distinct from said image acquisition device, adapted to acquire a representation of data visible on said label of said container;

a data processor adapted to recognize and compare the acquired address information and postage information appearing on each mailpiece and the acquired data visible on said label, to verify that mailpiece weight, address information and postage information on said mailpieces corresponds to said data on said label.

2. The apparatus of claim 1, further comprising infeed means for transporting said mailpieces from an input stage to subsequent processing stages.

3. The apparatus of claim 2, wherein said infeed means comprises an infeed conveyor mechanism that singulates the mailpieces for subsequent processing.

4. The apparatus of claim 1, wherein said scale comprises an in-line scale that weighs each mailpiece individually.

5. The apparatus of claim 1, further comprising identification printing means for applying numeric identification to at least some of the mailpieces after said address information and postage information appearing on each mailpiece has been acquired by said image acquisition device, said numeric identification being printed apart from said address information and postage information.

6. The apparatus of claim 5, wherein said printing means comprises an ink jet print head.

7. The apparatus of claim 6, wherein said print head is disposed along the transport path.

8. The apparatus of claim 1, wherein said image acquisition device comprises a CCD camera and illumination means.

9. The apparatus of claim 8, wherein said illumination means comprises a plurality of support structures housing light-directing fibers.

10. The apparatus of claim 1, wherein said data processor returns postage information relating to postage type, wherein postage type is selected from the group of postage types consisting essentially of:

meter;

permit; and stamp.

11. The apparatus of claim 10, wherein said data processor returns postage value.

12. The apparatus of claim 10, wherein said data processor returns postage class.

13. The apparatus of claim 1, wherein said data processor returns address information.

14. The apparatus of claim 1, wherein said address information on each mailpiece includes a barcode, and said data processor returns barcode information.

15. The apparatus of claim 14, wherein said barcode information comprises barcode decode value.

16. The apparatus of claim 14, wherein said barcode information comprises barcode print quality information.

17. The apparatus of claim 1, wherein said data processor comprises a microcomputer.

18. The apparatus of claim 1, further comprising stacking means for re-collecting mailpieces.

19. The apparatus of claim 18, wherein mailpieces disposed along the transport path are arranged in an original order and orientation, and said stacking means re-collects the mailpieces in said original order and orientation.

20. The apparatus of claim 1, wherein said pre-established rules include bar code print quality.

21. The apparatus of claim 1, wherein said pre-established rules include compatibility of bar code decode value and address information.

22. The apparatus of claim 1, wherein said pre-established rules include destination sort requirements.

23. The apparatus of claim 22, wherein said sort requirements are valid for a current sort data base.

24. The apparatus of claim 22, wherein said sort requirements are valid for one or more prior sort databases.

25. The apparatus of claim 1, wherein said pre-established rules include weight restrictions.

26. The apparatus of claim 1, wherein said pre-established rules include postage type restrictions.

27. The apparatus of claim 1, wherein said pre-established rules include postage value restrictions.

28. The apparatus of claim 1, wherein said pre-established rules include postage class restrictions.

29. The apparatus of claim 1, wherein verification results are printed as reports in a predetermined format.

30. The apparatus of claim 1, wherein said scanning device automatically reads a barcode associated with groups of mailpieces.

31. The apparatus of claim 1 wherein said data processor comprises:

a control processor adapted to control acquisition, and verification of said selected information visible on said mailpieces and said data on said label; and an image processing device in communication with said control processor, said image processing device adapted to synchronize acquisition, storage and verification of said selected information visible on said mailpieces and said data on said label.

32. The apparatus of claim 31, wherein said printer comprises an ink jet print head disposed proximate to said image acquisition device.

33. An apparatus for automatically acquiring, storing, and verifying information from a plurality of pre-sorted mailpieces, each mailpiece including selected information visible on a face of each mailpiece, said plurality of pre-sorted mailpieces delivered to said apparatus in a container, said container accompanied by a label having certain data pertaining to said plurality of mailpiece visible on said label, said apparatus adapted to process the selected information on each mailpiece and the data visible on said label to verify the accuracy of said selected information on each mailpiece, and the accuracy of said data on said label relative to each other, the apparatus comprising:
- an infeed device adapted to transport said mailpieces from an input stage to subsequent processing stages;
- a scale adapted to measure the weight of mailpieces being processed;
- an image acquisition device adapted to acquire a representation of said selected information visible on each mailpiece;
- a scanning device, separate and distinct from said imaging device, adapted to acquire a representation of data visible on said label of said container;
- a control processor device adapted to control acquisition, storage, and verification of said selected information visible on said mailpieces and said data on said label, said control processor adapted to compare said selected information with said data to verify that one corresponds to the other; and
- an image processing device, in communication with said control processor device, adapted to synchronize acquisition, storage, and verification of said selected information visible on said mailpiece and said data on said label.

34. The apparatus of claim 33, wherein said infeed device comprises an infeed conveyor mechanism that singulates the mailpieces for subsequent processing.

35. The apparatus of claim 33, wherein said scale comprises an in-line scale that weighs each mailpiece individually.

36. The apparatus of claim 33, wherein said image acquisition device comprises a CCD camera and illumination means.

37. The apparatus of claim 36, wherein the illumination means comprises a plurality of support structures housing light directing fibers.

38. The apparatus of claim 33, wherein the control processor device comprises a microcomputer controller in communication with the image processing device.

39. The apparatus of claim 38, wherein the control processor device communicates with the image processing device via a serial communications protocol.

40. The apparatus of claim 33, wherein the image processing device is a microprocessor controller in serial communication with the control processor device.

41. The apparatus of claim 32 wherein said selected information indicia comprises address information and postage information visible on a face of each mailpiece.

42. The apparatus of claim 33 including a printer adapted to affix identifying information to each mailpiece after said selected information visible one each mailpiece has been acquired by said image acquisition device, said identifying information being printed apart from said selected information.

43. An apparatus for processing and verifying information disposed upon mailpieces to be mailed by a mailer, each mailpiece including address information and postage information visible on a face of each mailpiece, said mailpieces being associated with submitted information supplied by the mailer, said apparatus adapted to process the address information and postage information on each mailpiece to verify the accuracy of said address information and postage information on each mailpiece with respect to said submitted information, the apparatus comprising;
- an infeed magazine in communication with a transport mechanism defining a transport path for the mailpieces;
- a weighing station receiving mailpieces from the transport mechanism and weighing each mailpiece individually;
- a camera unit positioned along a scanning locus that scans the address information and postage information disposed on each mailpiece and stores said address information and postage information in an associated memory;
- an illumination mechanism associated with the camera unit, providing illumination directed toward the scanning locus; and
- a control processor and an image processor interconnected by a serial communication link, the control and image processors synchronizing data acquisition, storage, and comparison of said address information and postage information visible on a face of each mailpiece with said submitted information supplied by the mailer, for verification that said address information and postage information disposed upon the mailpiece corresponds to said submitted information.

44. The apparatus of claim 43, wherein the serial communication link comprises a bi-directional serial link over which commands, status messages, and data packets are exchanged.

45. The apparatus of claim 44, wherein the bi-directional serial link comprises an RS-232 serial link at approximately 19,200 baud.

46. The apparatus of claim 44, wherein serial messages are exchanged over the serial communication link, and each serial message begins with a predetermined start character and ends with a predetermined stop character.

47. The apparatus of claim 46, wherein the start character and stop character are 1 byte ASCII characters.

48. The apparatus of claim 46, wherein each serial message includes cyclic redundancy check information.

49. The apparatus of claim 46, wherein each serial message includes a sequence number.

50. The apparatus of claim 44, wherein each message is acknowledged by a recipient through transmission of an acknowledgement message when the message is received correctly.

51. The apparatus of claim 50, wherein each acknowledgment message includes the sequence number.

52. The apparatus of claim 49, wherein each incorrectly received message causes a negative acknowledgment message to be transmitted.

53. The apparatus of claim 52, wherein a sender resends a message at least once if an acknowledgement message is not received within a predetermined time.

54. An apparatus for automatically acquiring and verifying, relative to pre-established rules, information from a plurality of mailpieces transported along a transport path, each mailpiece including selected information visible on a face of each mailpiece, said plurality of mailpieces delivered to said apparatus in a container, said container accompanied by a label with certain data pertaining to said plurality of mailpieces visible on said label, said apparatus adapted to process the selected information on each mailpiece and the data on said label to verify the accuracy of said selected information on each mailpiece and the accuracy of said data on said label relative to each other, the apparatus comprising:

a scale adapted to measure the weight of each mailpiece being processed;

an image acquisition device adapted to acquire a representation of said selected information visible on each mailpiece;

a scanning device, separate and distinct from said image acquisition device, adapted to acquire a representation of said data visible on said label of said container;

a data processor adapted to recognize and compare the acquired selected information visible on each mailpiece and the acquired data visible on said label, to verify that the selected information visible on said mailpieces corresponds to said data visible on the label.

55. The method claim 54 wherein the address information on each mailpiece includes a barcode, and said data processing system returns barcode information.

56. The method of claim 55, wherein said barcode information comprises barcode decode value.

57. The method of claim 55, wherein said barcode information comprises barcode print quality information.

58. A method for automatically acquiring, storing, and verifying information from a plurality of pre-sorted mailpieces, each mailpiece including address information and postage information visible on a face of each mailpiece, said plurality of pre-sorted mailpieces provided in a container, said container accompanied by a label with certain data visible thereon pertaining to said plurality of mailpieces, said method processing the address information and postage information on each mailpiece and the data on said label to verify the accuracy of said address information and postage information on each mailpiece, and the accuracy of said data on said label relative to each other, the method comprising the steps of:

a) removing said pre-sorted mailpieces from said container;

b) feeding each of said mailpieces in a pre-determined sequence to a weighing station;

c) weighing each mailpiece individually;

d) transmitting an electronic signal representative of said mailpiece weight to a data processing system;

e) capturing an electronic image of said address information and postage information on each mailpiece;

f) transmitting an electronic signal representative of said address information and postage information to said data processing system;

g) capturing an electronic image of said data visible on said label of said container;

h) transmitting an electronic signal representative of said data visible on said label to said data processing system;

i) recognizing said address and postage information appearing on each mailpiece by said data processing system, and j) comparing the address and postage information on each mailpiece with the mailpiece weight and the data visible on said label, to verify that one corresponds to the other.

59. the method of claim 58 including the further step of printing an identifying indicia, separate from said address and postage information, on each mailpiece, after said address information and postage information on each mailpiece has been captured.

60. The method of claim 58 including the further step of re-collecting said verified mailpieces in said predetermined sequence.

61. The apparatus of claim 60, wherein the mailpieces are arranged in an original order and orientation during pre-sort, and the step of re-collecting said mailpieces in said predetermined sequence includes re-collecting the mailpieces in said original order and orientation.

62. The method of claim 58 wherein said data processing system comprises a control processor and an image processor interconnected by a serial communication link, the control and imaging processors synchronizing information acquisition, storage and comparison for verification of address information and postage information disposed on the mailpieces and information visible on the label.

63. The method of claim 58 wherein the data processing system returns postage information relating to postage type selected from the group of postage types consisting essentially of:

meter;

permit; and stamp.

64. The method of claim 59 wherein said data processing system returns postage value.

65. The method of claim 59 wherein said data processing system returns postage class.

66. The method of claim 58 wherein said data processing system returns address information.

67. The method of claim 58, wherein said pre-established rules include barcode print quality.

68. The method of claim 58, wherein said pre-established rules include compatibility of barcode decode value and address information.

69. The method of claim 58, wherein said pre-established rules include destination sort requirements.

70. The method of claim 68, wherein said sort requirements are valid for a current sort database.

71. The method of claim 59, wherein said sort requirements are valid for one or more prior sort databases.

72. The method of claim 58, wherein said pre-established rules include weight restrictions.

73. The method of claim 58, wherein said pre-established rules include postage type restrictions.

74. The method of claim 58, wherein said pre-established rules include postage class restrictions.

75. The method of claim 58, wherein verification results are printed as reports in a predetermined format.

76. The method of claim 58, wherein said step of capturing an electronic image of said data imprinted on said label includes reading a barcode associated with groups of mailpieces.

77. An apparatus for automatically acquiring and verifying, relative to pre-established rules, information from a plurality of mailpieces transported along a transport path, each mailpiece including actual postage information visible an a face of each mailpiece, and being associated with submitted postage information, the apparatus comprising:

a scale adapted to measure the weight of each mailpiece being processed;

an image acquisition device adapted to acquire a representation of actual postage information appearing an each mailpiece;

a scanning device, separate and distinct from said image acquisition device, adapted to acquire said submitted postage information;

a data processor adapted to determine required postage from the weight of the mailpiece based an the pre-established rules, and compare the acquired actual postage information appearing an each mailpiece with the required postage to verify actual postage information corresponds to the required postage and the submitted postage information.

* * * * *

UNITED STATES PATENT AND TRADEMARK OFFICE
CERTIFICATE OF CORRECTION

PATENT NO. : 6,311,892 B1
DATED : November 6, 2001
INVENTOR(S) : O'Callaghan et al.

It is certified that error appears in the above-identified patent and that said Letters Patent is hereby corrected as shown below:

<u>Drawings,</u>
Figure 1 should be replaced by the attached substitute drawing page of Figure 1.

<u>Column 7,</u>
Line 37, the word -- and -- should be inserted after "mailpiece," and before "the".

<u>Column 9,</u>
Line 63, "32" should be -- 33 --.
Line 64, the word "indicia" should be deleted.

<u>Column 10,</u>
Line 1, the word "one" should be -- on --.

<u>Column 11,</u>
Line 25, the word "address" should be -- selected --.

<u>Column 12,</u>
Line 1, the first word "the" should be -- The --.
Lines 28 and 30, "59" should be -- 63 --.
Line 41, "68" should be -- 69 --.
Line 43, "59" should be -- 69 --.
Line 61, the word "an" should be -- on --.

<u>Column 13,</u>
Line 5, the word "an" should be -- on --.

<u>Column 14,</u>
Line 1, the word "an" should be -- on --.

Signed and Sealed this

Twenty-seventh Day of August, 2002

*Attest:*

JAMES E. ROGAN
*Director of the United States Patent and Trademark Office*

*Attesting Officer*